United States Patent [19]
Maxwell

[11] Patent Number: 5,872,743
[45] Date of Patent: Feb. 16, 1999

[54] METHOD AND APPARATUS FOR LOCATING THE USER OF A COMPUTER SYSTEM

[75] Inventor: Conrad A. Maxwell, Irvine, Calif.

[73] Assignee: VLSI Technology, Inc., San Jose, Calif.

[21] Appl. No.: 21,080

[22] Filed: Feb. 10, 1998

[51] Int. Cl.[6] ................................................. G01S 15/00
[52] U.S. Cl. ............................................. 367/96; 367/99
[58] Field of Search ....................... 367/96, 99; 381/103

[56] References Cited

U.S. PATENT DOCUMENTS

| | | | |
|---|---|---|---|
| 4,506,354 | 3/1985 | Hansen | 367/101 |
| 4,814,552 | 3/1989 | Stefik et al. | 178/18 |
| 4,823,391 | 4/1989 | Schwartz | 381/103 |
| 5,107,746 | 4/1992 | Bauer | 84/626 |
| 5,161,197 | 11/1992 | Griesinger | 381/56 |
| 5,214,615 | 5/1993 | Bauer | 367/128 |
| 5,233,664 | 8/1993 | Yanagawa et al. | 381/89 |
| 5,255,326 | 10/1993 | Stevenson | 381/110 |
| 5,386,478 | 1/1995 | Plunkett | 381/103 |
| 5,412,619 | 5/1995 | Bauer | 367/128 |
| 5,467,401 | 11/1995 | Nagamitsu et al. | 381/63 |
| 5,544,249 | 8/1996 | Opitz | 381/63 |
| 5,588,063 | 12/1996 | Edgar | 381/24 |

*Primary Examiner*—Daniel T. Pihulic
*Attorney, Agent, or Firm*—Woodard, Emhardt, Naughton, Moriarty & McNett

[57] ABSTRACT

A method and apparatus for locating the user of a computer system and adjusting the sound from the system speakers. The computer system includes a computer, two speakers, a microphone, a signal processor, and an audio processor. The speakers emit a sound which is reflected from the user and other objects in the vicinity of the system. The invention includes an algorithm for determining which of the reflected sounds had been reflected from the user of the computer system. The character of the sound emitted by the computer system is then adjusted to enhance the sound effects at the location of the user.

13 Claims, 4 Drawing Sheets

METHOD AND APPARATUS FOR LOCATING THE USER OF A COMPUTER SYSTEM

BACKGROUND OF THE INVENTION

The present invention relates to methods and apparatus for determining the location of the user of a computer, and in particular to adjusting the sound controlled by the computer to enhance the stereo effect at the location of the user.

With the advent of multimedia computers, the sound controlled by the software, especially gaming software, has become an increasingly important part of the multimedia environment. Multimedia software makes significant use of right and left stereo separation to augment the images being displayed by the software.

It is thus important to provide sound with high quality. However, it is difficult to produce high quality sound for the computer system user as the user moves about. This is especially true for a user playing a game on a computer system, in which case the location of the user is not as fixed as in those situations where the user is typing with a word processing program, for example. The user of a computer game may assume a variety of locations relative to the computer while the game is being played.

Some computer systems, for example, the system described in U.S. Pat. No. 5,588,063 issued to Edgar, attempt to modify the sound in the vicinity of a user, but only for limited movements of the user. Furthermore, the system uses two complex and expensive arrays of speakers. The speakers are used as phased arrays to enhance the sound at the location of the user's ears, but to the detriment of the sound heard by others nearby.

What is needed is computer system that overcomes the disadvantages of other designs. The present invention does this in a novel and unobvious way.

SUMMARY OF THE INVENTION

One aspect of the present invention concerns a method of locating a person using a computer. The method includes emitting a first sound comprising a plurality of frequencies, and receiving a first reflected sound in response to the first sound being reflected from an object. The amplitude of the emitted first sound is calculated at a plurality of frequencies, and the amplitude of the reflected first sound is calculated at a plurality of frequencies. The amplitude of the emitted fist sound is compared to the amplitude of the reflected first sound for at least two of the frequencies. The method includes recognizing from the comparison if the object is a portion of a person.

These and other objects and advantages of the present invention will be apparent from the drawings, description of the preferred embodiment, and the claims to follow.

DESCRIPTION OF THE PREFERRED EMBODIMENT

Figure 1:
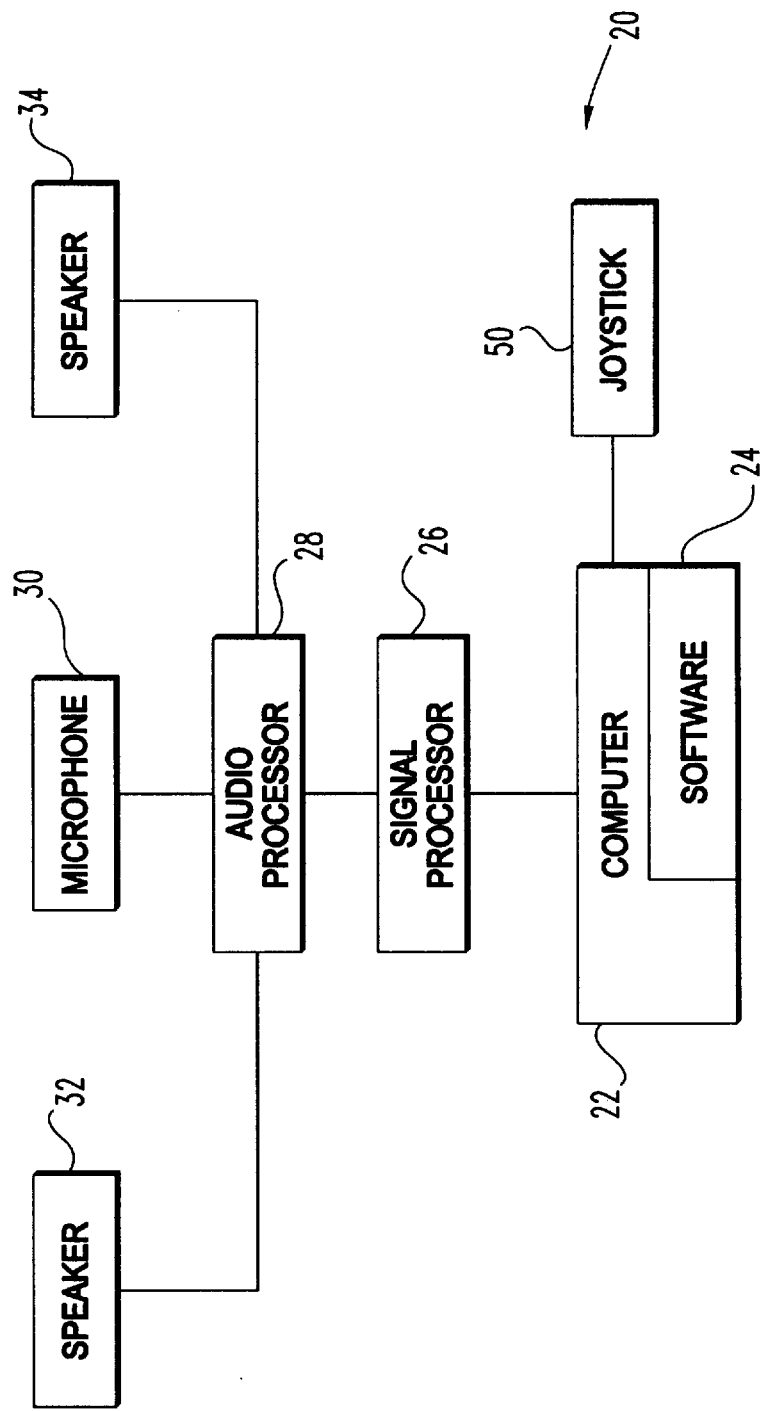
FIG. 1 is a schematic representation of a computer system in accordance with one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the illustrated device, and any further applications of the principles of the invention as illustrated therein are contemplated as would normally occur to one skilled in the art to which the invention relates.

FIG. 1 is a schematic representation of a computer system 20 in accordance with one embodiment of the present invention. System 20 includes a computer 22 operating with software 24. Computer 22 includes processing capability equivalent to an Intel 486 central processing unit or better. It is preferable that computer 22 include a central processing unit equivalent to or better than an Intel Pentium™ central processing unit. Computer 22 preferably includes at least 2 megabytes of random access memory for storage during the calculations described herein. Software 24 may be of a wide variety of programs, including word processing programs, spreadsheet programs, and other programs used in the home and business. One embodiment of the present invention is adapted for use with gaming software. Software 24 includes data which is transmitted from the speakers as a sequence of audible sounds. For example, gaming software 24 may include sounds associated with images displayed on video display terminal 36. This data to be transmitted as audible sounds is provided with a predetermined stereo balance intensity that often assumes an arrangement of speakers 32 and 34 that are symetrical with respect to the user. One embodiment of the present invention includes an algorithm 100 (see FIG. 3), portions of which may be implemented within software 24.

Computer system 20 also includes a signal processor 26 receiving commands from and providing data to computer 22. Signal processor 26 may be a separate circuit card within computer 22, a portion of a circuit card within computer 22, a chip within computer 22, or embodied within a chip such as the central processor unit that performs other functions within computer 22. Signal processor 26 is capable of constructing electrical signals to be provided to audio processor 28, and is also capable of receiving electrical signals from audio processor 28. Signal processor 26 may transmit and receive this information from audio processor 28 in either analog or digital fashion. Signal processor 26 is capable of constructing signals or analyzing signals from about 50 HZ to about 25 KHZ. Signal processor 26 includes the hardware and software necessary to perform Fourier analysis within this frequency range. Processor 26 is preferably housed within computer 22, but may also be a stand alone module. Various functions described herein for processor 26 may also be performed within the central processing unit. It is preferable that processor 26 include at least one equalizer for modifying the frequency content of sound data received from software 24 within computer 22. For example, this equalizer can boost or reduce the amplitude of a particular frequency band.

Audio processor 28 receives electrical signals from signal processor 26 that may be in either analog or digital form. For those embodiments of the present invention where the electrical signals received from signal processor 26 are digital in nature, processor 28 includes a digital to analog converter (DAC) that creates an analog electrical signal from the digital electrical signal. Audio processor 28 includes the amplification and filtering necessary to receive the analog electrical signals and provide an input electrical signal to each of speakers 32 and 34. Audio processor 28 is capable of sending input electrical signals to speakers 32 and 34 in a range from about 50 HZ to about 25 KHZ. Audio processor 28 is also capable of receiving returned electrical signals from a microphone 30 in the range from about 50 HZ to about 25 KHZ. Processor 28 may include a sound card.

Speakers 32 and 34 are spaced apart horizontally and arranged in such a fashion as to produce a stereo effect upon a user of computer system 20. Speakers 32 and 34 may be of any type of speaker, including for example, cone type speakers with a cross-over network utilizing a woofer for lower frequencies and a tweeter for higher frequencies. Speakers 32 and 34 are capable of receiving input electrical signals from processor 28 and generating comparable sound pressure waves.

Microphone 30 is capable of receiving sound pressure waves and generating a returned electrical signal which is provided to audio processor 28. Microphone 30 is especially useful for receiving voice data from the user of system 20, but is also capable of receiving sound pressure waves and generating returned electrical signals in the range from about 15 KHZ to about 100 HZ. In a preferred embodiment of the present invention microphone 30 is capable of receiving sound pressure waves and generating returned electrical signals from about 50 HZ to about 25 KHZ. It is preferable that microphone 30 be separate from speakers 32 and 34, so as to avoid the cost of a combined emitter/receiver transceiver.

Figure 2:
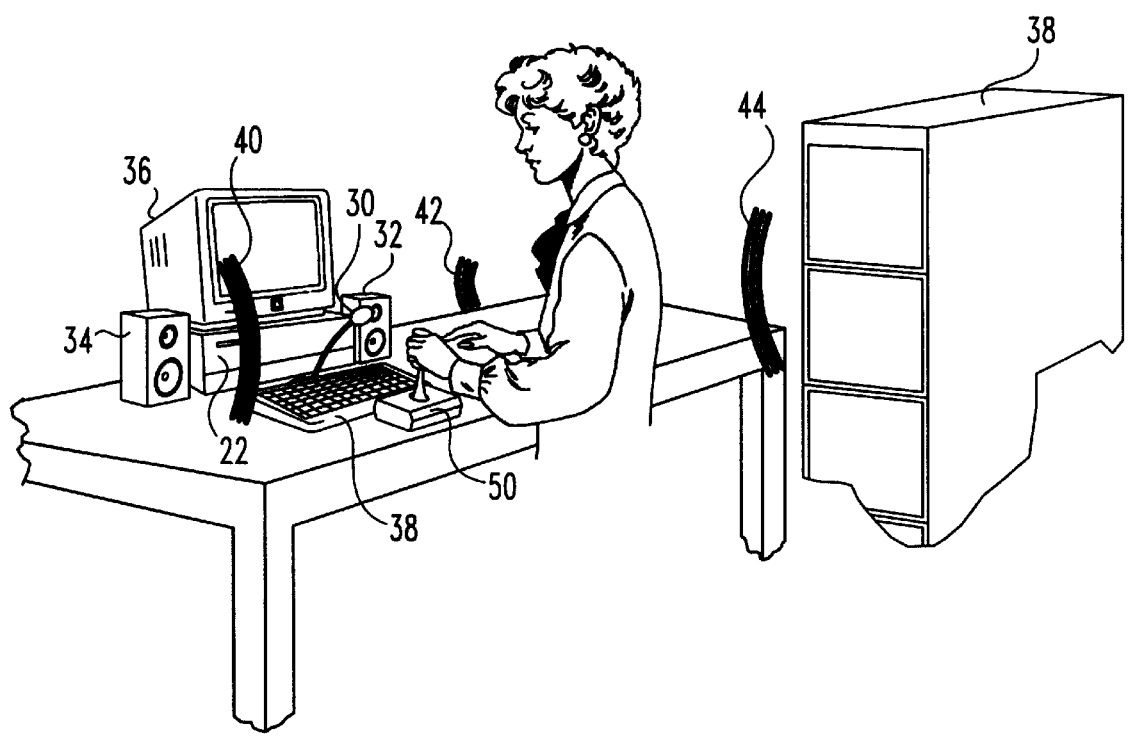
FIG. 2 shows the system of FIG. 1 in a room environment.

FIG. 2 shows one embodiment of the present invention in a room environment. A user is situated generally in front of computer 22 and using a joy stick or other game input device 50 to play a software game 24. There is also a keyboard 38 in front of the user for inputting commands to computer 22. Also located in the room is a filing cabinet 38 with metallic surfaces. Gaming software 24 is providing an image displayed upon video display terminal 36, and is also providing audible channels synchronized to the video display through speakers 32 and 34. Speakers 32 and 34 are located on either side of computer 22. In a preferred embodiment of the present invention speakers 32 and 34 are attached to computer 22, and likewise microphone 30 is attached to computer 22, such that the geometric positions of each speaker 32 and 34 relative to microphone 30 are known and fixed. However, the present invention also contemplates those arrangements of computer system 20 in which speakers 32 and 34 and microphone 30 may be moved to other locations, although it will be necessary for reasons to be described herein that the positions of each speaker 32 and 34 relative to microphone 30 are known.

Figure 3A:
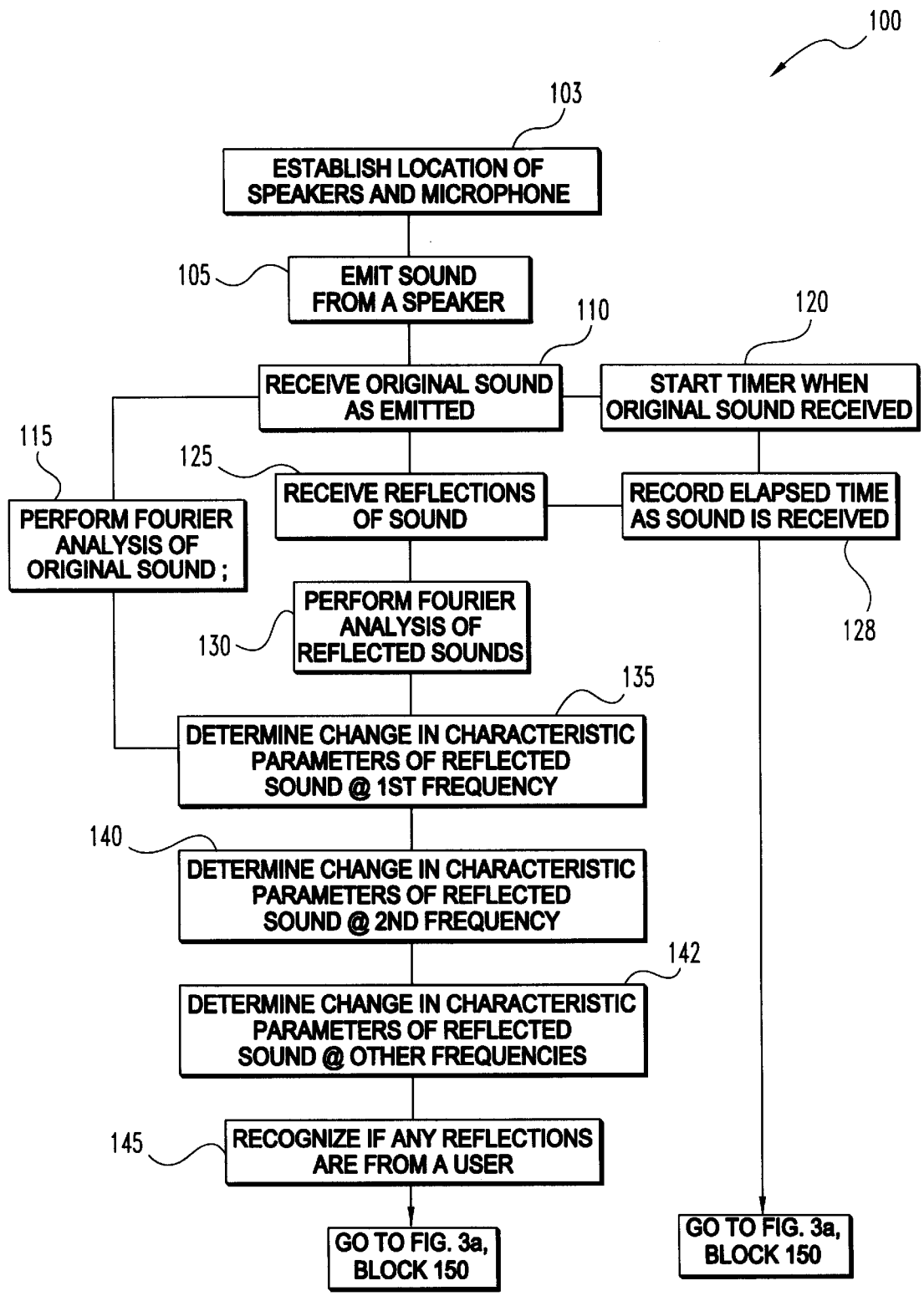
FIGS. 3a and 3b show a block diagram of an algorithm in accordance with one embodiment of the present invention for locating a person using a computer.
Figure 3B:
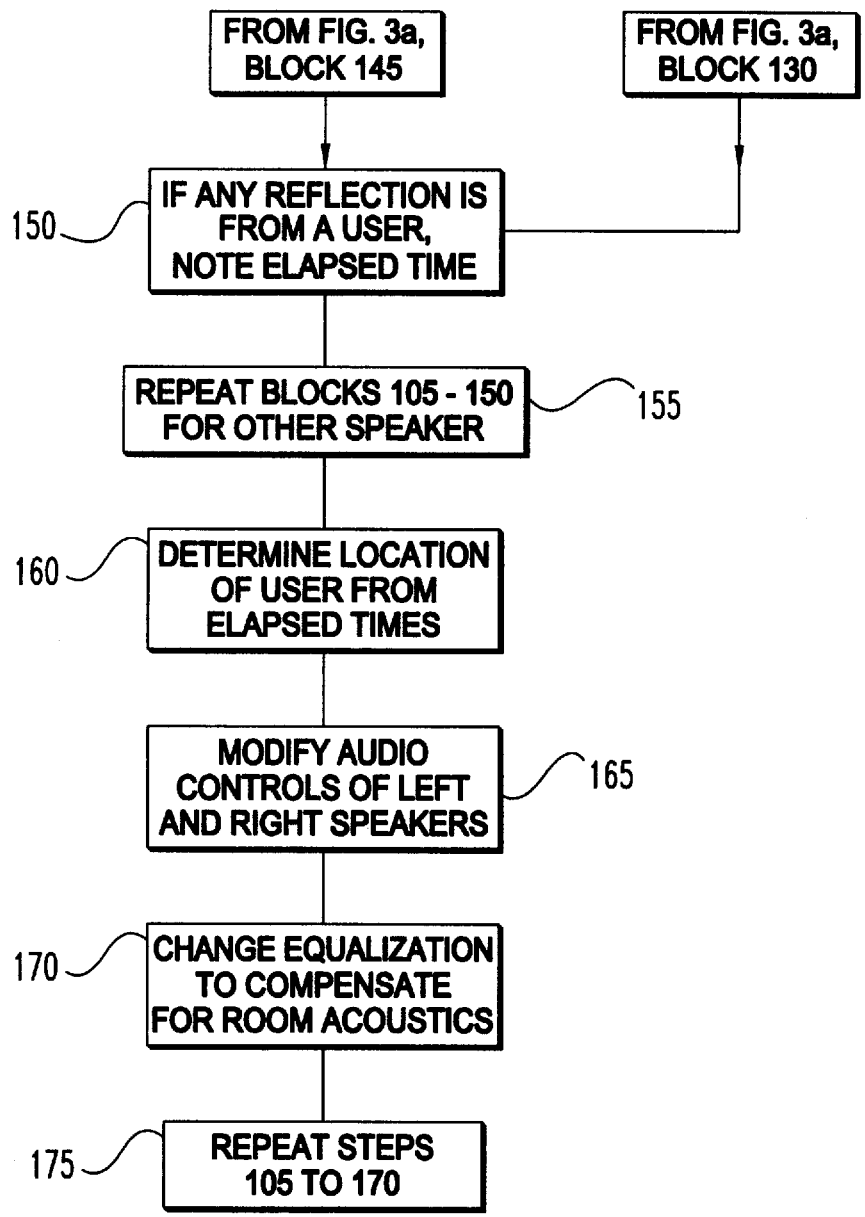

One embodiment of the present invention includes an algorithm 100 for determining the location of a person using a computer, such as that illustrated in FIG. 2. FIGS. 3a and 3b show a block diagram of an algorithm in accordance with one embodiment of the present invention for locating a person using a computer. Algorithm 100 includes establishing the location of speakers 32 and 34 and microphone 30. For those embodiments of the present invention where speakers 32 and 34 and microphone 30 are affixed to computer 22, the relative geometric locations of the speakers and microphone need only be provided once. For those embodiments in which the speakers and microphone are moveable, the user provides the two dimensional coordinate distances of the speakers and microphone from computer 22, assuming all components are in a horizontal plane. This portion of the algorithm is noted in block 103.

Algorithm 100 includes block 105 in which a sound comprising a plurality of frequencies has been emitted from one of speakers 32 or 34. The sound emitted may be a plurality of distinct frequencies emitted sequentially or concurrently; a pulse such as a square wave or other waveform; or a sweep of frequencies. In the latter case the sweep has a continuously changing frequency. The frequencies emitted may be entirely in the range of frequencies audible to the human ear, although in one embodiment of the present invention the emitted sound includes an ultrasonic frequency. The emitted sound comprises a sound pressure wave corresponding to the input electrical signal to the speaker.

The sound emitted from speaker 32 or 34 varies in amplitude and phase from the input electrical signal sent by audio processor 28. For this reason the original sound as emitted from the speaker is received by microphone 30 as indicated in block 110. This original sound is received by microphone 30 which generates a returned electrical signal to processor 28. This returned electrical signal is then passed on as either an analog signal or a digital signal to signal processor 26, which performs a Fourier analysis of the original sound as indicated by block 115. The Fourier analysis is useful for calculating a representative of the returned electrical signal as a plurality of discrete frequency components, each with a characteristic amplitude. The present invention thus establishes a baseline Fourier analysis of the original sound as emitted by the speaker. This baseline analysis accounts for transmission effects within speakers 32 and 34 and reception effects within microphone 30. The reception of the original signal by microphone 30 also initializes and starts a timer as indicated by block 120.

The original sound is shown emanating as waves 40 in FIG. 2. As these original sound waves propagate throughout the environment of the user of system 20, the waves 40 come into contact with various objects. For example, as waves 40 propagate and reach filing cabinet 38, they are reflected and modified by cabinet 38. Cabinet 38 modifies the original sound wave 40 in a manner consistent with the shape, position, and surface texture of cabinet 38. Sound wave 40 is reflected from cabinet 38 as reflected sound 44. Reflected sound 44 propagates back to and is received by microphone 30, as indicated in block 125. When reflected sound 44 is received by microphone 30, the timer within computer 22 is checked and the elapsed time is noted from the emitting of the original sound to the receiving of the reflected sound (block 128). As reflected sounds from other objects surrounding the user are received by microphone 30, the particular reflected sound is associated with an elapsed time. Objects in the vicinity of computer system 20 are associated with different elapsed times that permits discrimination among the various objects.

Microphone 30 generates a returned electrical signal comparable to reflected sound 44. This returned electrical signal is received by processor 28, which then passes this data to signal processor 26 wherein Fourier analysis of the reflected sound is performed in order to calculate the characteristic parameters of the sound at the various frequency components (block 130). In general, there is a reduction in amplitude at all frequencies because of the general expansion of the sound pressure waves as they travel the distance from a speaker to a reflecting object and back to microphone 30.

Various characteristic parameters such as amplitude, phase shift, or time delay are altered and modified by various objects based upon the characteristics of the surface from which the sound is reflected. Hard surfaces such as those on cabinet 38 will reflect a significant portion of the sound pressure wave incident thereto. This is especially true at higher frequencies, for example frequencies in excess of 5 KHZ, and especially those frequencies in the ultrasonic range. In contrast, the rounded shape and generally soft surface of a human user of system 20 reflects a sound pressure wave 42 that is more attenuated than sound wave 44. For example, emitted sounds in excess of 5 KHZ, and especially those sounds at ultrasonic frequencies, are significantly attenuated after reflection from the human user. A Fourier analysis is performed for each reflected sound received by microphone 30.

Block 135 indicates comparison of the amplitudes of the frequency components from the Fourier analysis of the original sound to the amplitudes of the same frequency components from the Fourier analysis of the reflected sounds, for example at a first frequency component below 1 KHZ. The reflected sound is generally lower in amplitude at the particular frequency component than the originally emitted sound. Subtracting the amplitude of the reflected sound from the amplitude of the emitted sound quantifies a first amplitude reduction associated with the particular reflected sound at this first low frequency. Block 140 indicates a similar comparison of the amplitudes of the frequency components from the Fourier analysis of the original sound to the Fourier analysis of the reflected sound at a second frequency, for example at a frequency above about 5 KHZ. Subtraction of the amplitude of the reflected sound from the amplitude of the emitted sound quantifies a second amplitude reduction at this second high frequency.

The characteristic parameters such as amplitude, phase shift, or time delay of each reflected sound 42 and 44, are compared to the characteristic parameters of the originally emitted sound 40 as indicated in Blocks 135, 140, and 142. In general, reflected sounds have a reduction in the characteristic parameter of amplitude at each frequency component as compared to that same frequency component in the originally emitted sound 40. However, the reduction in amplitude of reflected sounds from a human user is greater at higher frequencies than the reduction in amplitude of reflected sounds from objects such as cabinets. On the other hand, lower frequency sounds are also reduced after reflection from a human user, but not as much as the amplitude reduction at higher frequencies. Thus, reflected sound 44 has a reduction in amplitude across frequencies that is more uniform than the reduction in amplitude in sound 42. In contrast, reflected sound 42 has more reduction at higher frequencies than at lower frequencies. Thus, the first amplitude reduction associated with sound wave 44 is of a magnitude similar to the second amplitude reduction associated with sound wave 44. In contrast, the second amplitude reduction associated with the sound wave 42 is of a magnitude greater than the first amplitude reduction associated with sound wave 42. A second amplitude reduction calculated to be at least 1 decibel less than the first amplitude reduction is sufficient for algorithm 100 to recognize sound wave 42 as being reflected from a human user (block 145). In other embodiments of the present invention phase shifting and time delays that correspond to the characteristics of the reflection surface are used to discriminate the human user from other objects.

After a particular reflected sound wave is recognized from the comparison of the amplitude reductions as being reflected from a portion of a person, then as indicated in block 150 the elapsed time for the particular reflected sound wave is noted. The aforementioned logic of blocks 105 through 150 is repeated for the other speaker, as noted in block 155. The present invention also contemplates those embodiments in which sounds are emitted simultaneously from speakers 32 and 34 during block 105. In those embodiments the frequencies emitted by speaker 32 are different from the frequencies emitted by speaker 34. By emitting different frequencies from the two speakers 32 and 34 it is possible to implement logic blocks 105–150 in nearly simultaneous fashion. The use of different frequencies permits sounds to be simultaneously emitted from speakers 32 and 34 and simultaneously received by microphone 30 without processor 28 or processor 26 encountering ambiguity about the source of the emitted sound.

After again comparing the amplitude reductions of the emitted sounds to the amplitude reductions of the reflected sounds and recognizing from the comparison if an object is a portion of a person, another elapsed time is noted for the second speaker. Thus there is a first elapsed time associated with the distance from the user to the first speaker, and a second elapsed time associated with the distance from the user to the second speaker. The location of the user can then be determined from knowledge of the first and second elapsed times. Knowing the speed of sound within a typical room environment and also knowing the relative geometric locations of the speakers 32 and 34 and microphone 30, it is possible to redefine each elapsed time as a radial distance from the respective speaker in a method known to those of ordinary skill in the art as triangulation. The intersection of the radial distances from each speaker is the location of the user (block 160).

The difference between the first elapsed time and the second elapsed time is thus used to adjust the audio content coloration of sounds being transmitted from the speakers during the execution of software 24, for example during the playing of a game. Audio content coloration parameters of the sound that may be adjusted includes the intensity or amplitude, phase content, signal delays, equalization, or other audio content parameters. The shorter elapsed time indicates that the user is closer to that particular speaker. The intensity, phase, time delay, or other audio parameter, of the sound from that speaker may then be reduced, or alternatively the parameter of the sound from the other speaker may be increased as indicated in block 165. Thus, the present invention can modify the predetermined stereo balance, phase, time delay, or other audio parameter of the sound data within software 24 based upon the location of the user.

The present invention includes both apparatus and methods for distinguishing a user of computer system 20 from other nearby objects. Algorithm 100 is repeated on a regular basis during operation of software 24. This regular update rate permits the present invention to track the user as the user moves around the room. The present invention is useful for gross movements by the user.

The present invention includes the ability to shift the right and left stereo balance from speakers 32 and 34 so as to enhance the stereo effect at the location of the user. In addition, the present invention includes equalization of the input electrical signals to the speakers by modifying the frequency content of the input electrical signals to compensate for the acoustics of the room (block 170). As a result, although the present invention shifts the stereo balance in favor of the located user, there is good quality sound for other listeners throughout the room. The present invention does not attempt to modify the sound outputs of speakers 32 and 34 so as to isolate the located user.

The present invention utilizes two speakers and a single separate microphone and is thus applicable to a wide range of computer systems. In a most preferred embodiment the present invention includes only two speakers 32 and 34, and a microphone 30 that is nonintegral with either of the speakers. In this most preferred embodiment the overall cost of system 20 is kept low relative to competing designs that include multiple arrays of speakers and/or combined speaker and microphone transceivers. Speakers 32 and 34 may include multiple cones that are driven by a crossover network that receives the input electrical signal and provides different frequency bands to different cones.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for locating a person using a computer, comprising: emitting a first sound comprising a plurality of frequencies;

receiving a first reflected sound in response to the first sound being reflected from an object;

calculating the amplitude of the first emitted sound at a plurality of frequencies;

calculating the amplitude of the first reflected sound at a plurality of frequencies;

comparing the amplitude of the first emitted sound to the amplitude of the first reflected sound for at least two of the frequencies; and recognizing from said comparing of the first emitted sound and first reflected sound if the object is a portion of a person.

2. The method of claim 1 wherein said emitting is from a first speaker and said receiving is by a microphone.

3. The method of claim 1 which further comprises:

emitting a second sound comprising a plurality of frequencies from a second speaker;

receiving a second reflected sound in response to the second sound being reflected from an object;

calculating the amplitude of the second emitted sound at a plurality of frequencies;

calculating the amplitude of the second reflected sound at a plurality of frequencies;

comparing the amplitude of the second emitted sound to the amplitude of the second reflected sound for at least two of the frequencies; and recognizing from said comparing of the second emitted sound and second reflected sound if the object is a portion of a person.

4. The method of claim 3 which further comprises:

measuring a first elapsed time from said emitting a first sound to said receiving the first reflected sound;

measuring a second elapsed time from said emitting a second sound to said receiving the second reflected sound; and determining from said measuring a first elapsed time and from said measuring a second elapsed time the location of the portion of the person.

5. The method of claim 4 which further comprises:

transmitting from the first speaker and the second speaker a sequence of audible sounds; and adjusting the intensity of transmitted sounds based upon the location of the portion of the person.

6. The method of claim 3 wherein said recognizing from said comparing of the first sounds includes:

determining a first amplitude reduction of the first reflected sound relative to the first emitted sound at a first frequency below about 1 KHZ;

determining a second amplitude reduction of the first reflected sound relative to the first emitted sound at a second frequency above about 5 KHZ; and calculating the second amplitude reduction to be at least 1 decibel less than the first amplitude reduction.

7. The method of claim 6 wherein said emitting a first sound comprises a sweep of frequencies.

8. The method of claim 6 wherein said emitting a first sound comprises a pulse.

9. An apparatus, comprising:

two speakers spaced apart horizontally, said speakers capable of receiving an input electrical signal and generating a comparable sound pressure wave;

a first microphone capable of receiving a sound pressure wave and generating a returned electrical signal;

a processor for sending input electrical signals to said speakers and receiving returned electrical signals from said first microphone;

a signal processor capable of determining the amplitude of the input electrical signals at a plurality of frequencies; and a computer with software, the software including data intended to be replicated as stereo sound with a predetermined balance, said computer providing the data to said controller for transmitting the stereo sound to a user of said computer;

wherein said computer is programmed with an algorithm to determine the location of the user by comparing the sound pressure waves generated by said speakers to the sound pressure waves received from said microphone when the algorithm is executed, said computer modifying the predetermined stereo balance based upon the location of the user.

10. The apparatus of claim 9 wherein there are only two said speakers.

11. The method of claim 1 wherein said emitting a first sound comprises a sweep of frequencies.

12. The method of claim 1 wherein said emitting a first sound comprises a pulse.

13. The method of claim 1 wherein said recognizing from said comparing of the first sounds includes:

determining a first amplitude reduction of the first reflected sound relative to the first emitted sound at a first frequency below about 1 KHZ;

determining a second amplitude reduction of the first reflected sound relative to the first emitted sound at a second frequency above about 5 KHZ; and calculating the second amplitude reduction to be at least 1 decibel less than the first amplitude reduction.

* * * * *

UNITED STATES PATENT AND TRADEMARK OFFICE
CERTIFICATE OF CORRECTION

PATENT NO : 5,872,743
DATED : February 16, 1999
INVENTOR(S): Conrad A. Maxwell

It is certified that error appears in the above-identified patent and that said Letters Patent is hereby corrected as shown below:

On the title page
   item [56], References Cited, please add the following references:

5,430,802   7/1995   Page       381/96

5,721,784   2/1998   Bernardo   381/89

Signed and Sealed this

Twenty-eighth Day of March, 2000

Attest:

Q. TODD DICKINSON

Attesting Officer

Commissioner of Patents and Trademarks